United States Patent Office 3,595,685
Patented July 27, 1971

3,595,685
METHOD FOR PREPARING SUEDE-LIKE MATERIAL
Tosaku Maeda, Sadao Fujii, and Takeshi Nakamura, Kyoto, Japan, assignors to Nippon Cloth Industry Co., Ltd., Ukyo-ku, Kyoto, Japan
No Drawing. Filed Dec. 27, 1968, Ser. No. 787,611
Int. Cl. B44d 1/44; D06n 3/04
U.S. Cl. 117—63         4 Claims

ABSTRACT OF THE DISCLOSURE

A suede-like material is prepared by coating a fibrous substrate with a mixture consisting of a synthetic polymer having a hardness of 75 to 95, a solvent for said polymer miscible with water, and 0.5 to 7 parts by weight of non-deliquesceable 50–400 mesh powders soluble in water but insoluble in the said solvent, per one part of said synthetic polymer, exposing the coated substrate to a high moisture atmosphere to coagulate the polymer, dipping the fibrous substrate into water to extract the solvent and powders from the coated film and buffing the surface of the film with a buffing machine.

The present suede-like material is water washable and has a moisture permeability, and no fingerprints are left on the surface of the material.

---

This invention relates to a method for preparing a suede-like material and the suede-like material thus prepared, and more particularly to a method for preparing a suede-like material similar to natural suede leather and the suede-like material thus prepared.

The natural suede leather has been heretofore used as an upper material for shoes owing to its beautiful appearance and good feeling, but has had a number of disadvantages such as the fact that fingerprints are readily left on the leather surface; the leather cannot undergo water washing; and a uniform product cannot be obtained in a large amount. As a result of studies made heretofore by the present inventors, we have succeeded in overcoming these disadvantages.

An object of the present invention is to provide a method for preparing a suede-like material which is similar to natural suede leather in appearance and feeling and has none of the disadvantages seen in natural suede leather, by forming a porous synthetic polymer on a fibrous substrate. That is, according to the present invention, a suede-like material is prepared by coating a fibrous substrate such as a fabric, non-woven fabric, or paper with a mixture consisting of a synthetic polymer whose hardness is in a range of 75 to 95 according to Spring-type Hardness Test Procedure prescribed in JIS K–6301 (1962), a solvent having a solubility toward said synthetic polymer and a miscibility with water, and 0.5 to 7 parts by weight of water-soluble, non-deliquesceable powders having particle sizes of 50 to 400 mesh per one part by weight of said synthetic polymer, exposing the said coated fibrous substrate to a high moisture atmosphere to coagulate said synthetic polymer, dipping the fibrous substrate having the coagulated synthetic polymer into water to thereby extract the solvent and powders, and buffing the surface of the coated film on the substrate after drying.

The synthetic polymer usable in the present invention must be a polymeric elastomer having a hardness ranging from 75 to 95 according to Spring-type Hardness Test Procedure prescribed in JIS K–6301 (1962). The hardness is determined in a non-porous sheet. A polymer having a hardness less than 75 is too soft and gives a rubber-like feeling, whereas a polymer having a hardness of more than 95 gives a stiff feeling. Two or more of the polymeric elastomers having the same or different hardnesses can be used together. Further, a polymeric elastomer whose hardness has been adjusted and lowered by adding a plasticizer thereto can be used. However, in such cases, the hardness of the resulting mixture must be in said range, that is, 75 to 95.

The polymeric elastomer, which is called a "urethane elastomer" is particularly preferable in the present invention. The urethane elastomer is an elastomer prepared by reacting a polyester or polyether with a diisocyanate and further chain extending same with a substance having two active hydrogens such as a glycol or a diamine, and the hardness of the elastomer can be adjusted by the kinds and proportions of the raw materials employed. In addition, a polyvinyl chloride, polyamide, chlorosulfonated polyethylene, a copolymer of butadiene and acrylonitrile can be used alone or in a mixture as the polymeric elastomer.

Any solvent can be used so long as the solvent has solubility toward said synthetic polymer and a miscibility with water. That is, ethyl alcohol, methyl alcohol, acetone, methylethyl ketone, tetrahydrofuran, and N,N-dimethylformamide are typical of the solvent, and can be used alone or in combination in the present invention.

Any inorganic or organic powder can be used so long as they are powders having particle sizes of 50 to 400 mesh, which are insoluble in the solvent but soluble in water and is non-deliquesceable. The reason why deliquescence is undesirable is to avoid any deformation, or dissolution of the powders and the resulting deterioration of the surface of the finished product during the coagulating step. Further, the reason why the particle sizes of the powders are restricted to a range of 50 to 400 mesh is that a different product from natural suede leather is obtained if powders having particle sizes less or more than said range are used, and consequently the object of the present invention cannot be attained at all. The powders usuable in the present invention include sodium carbonate, sodium hydrogen carbonate, sodium sulfate, lactose, sodium tripolyphosphate, sodium pyrophosphate, and sodium dihydrogen pyrophosphate.

The amount of the powders is restricted to 0.5 to 7 parts by weight per one part of the synthetic polymeric substance because a product having a good appearance cannot be obtained when less than 0.5 part of the powders is used and the strength of the coated film is lowered when more than 7 parts of the powders are used. When 0.5 to 7 parts of the powders are used, a product having an appearance very similar to that of natural suede leather and having satisfactory strength at the same time can be obtained. In order to obtain a product having much better properties and much more beautiful appearance, the amount of powders to be added must be changed, depending upon the particle size of the powders. In general, a better product can be obtained by using a large amount of the powders when they have smaller particle sizes or by using a smaller amount of the powders when they have larger particle sizes.

In order to obtain a product having a uniform surface appearance it is desirable to use powders having relatively uniform particle sizes within said range of 50 to 400 mesh, but in order to obtain a product having a non-uniform surface appearance, it is necessary to use powders having some particle size distribution.

In some cases, a product having a uniform surface is preferable, depending upon the end use, but in order to obtain a product having an appearance similar to that of natural suede leather, it is rather necessary to make the surface appearance somewhat non-uniform.

In order to obtain a product having a surface appearance similar to that of natural suede leather, a better result can be obtained by adjusting the particle size distribution of the powders in the following manner. The particle size of the powders are based on the Tyler standard sieve.

(a) 0 to 10% by weight of 5080 mesh particles
(b) 20 to 80% by weight of 80–200 mesh particles, and
(c) 80 to 20% by weight of particles of more than 200 mesh.

The effect of these particle size distributions will be explained hereunder.

(1) Particles of less than 50 mesh correspond to coarse particles having particle sizes of more than 0.25 mm., and even if a small amount of such particles are added to the mixture, too large pores are obtained, and the appearance of the product becomes less beautiful. Thus, such particles cannot be used in the present invention.

(2) 50–80 mesh particles bring about coarse pores when such particles are used alone, but when a small amount of such particles are added to finer particles and used, the effect of making the surface somewhat non-uniform can be obtained. The appearance of natural suede leather is not always uniform, and in many cases is somewhat non-uniform. When it is necessary to give such effect to the appearance of a product, the small amount of 50–80 mesh particles are added to the mixture. However, such particles are not an essential component, and thus it is not necessary to add such particles to the mixture, when a product having a uniform surface appearance is required.

(3) 80–200 mesh particles are an essential component for giving the appearance of natural suede leather to a product. That is, such particles having particle sizes of 80 to 200 mesh can bring about an appearance very similar to that of natural suede leather from the viewpoint of the appearance of a napped surface. However, when such particles are used alone, an undesirable luster and somewhat rough feeling are imparted to the product.

(4) Particles of more than 200 mesh give too much fineness to the product surface when used alone, but when a proper amount of such particles are mixed with said 80–200 mesh particles and used, the disagreeable luster can be eliminated from the product surface, and a soft feeling similar to that of natural suede leather can be obtained.

As stated above, said particles (3) and (4) are essential for obtaining a product having an appearance similar to that of natural suede leather according to the present invention, and a small amount of the particles (2) is added to said mixture of the particles (3) and (4) and used if required.

In order to obtain powders having said particle size distribution, it is necessary to properly select the pulverizing method and pulverizing conditions and carry out pulverization, or prepare said component particles separately by changing the pulverizing conditions and then blending the component particles having different particle sizes to obtain said particle size distribution.

The synthetic polymer, powders, and solvent can be mixed and dissolved together at the same time, but generally it is preferable to dissolve the synthetic polymer in the solvent and then add the powders to the thus obtained solution.

Then, the thus prepared mixture is coated onto a fibrous substrate. Any sheet material such as fabric, nonwoven fabric, paper, or resin-impregnated fibrous sheets can be used as a fibrous substrate. To coat the fibrous substrate with the mixture, an ordinary method, such as a roll coating method and knife coating method can be used.

The coated substrate is then exposed to a high moisture atmosphere to coagulate the synthetic polymer while keeping the powders in their original shapes. A temperature of 40 to 60° C. and a relative humidity of 80 to 95% are most suitable as treating conditions, but the treating conditions are not restricted to these ranges. However, when coagulation is directly carried out in water without carrying out such exposure to the high moisture atmosphere, the powders are extracted together with the solvent, and consequently a product having a desirable appearance cannot be obtained.

After the coagulation treatment, the substrate is dipped in water to extract the solvent and powders, and then the surface of the coated film is buffed with a sand paper roll or other abrasive roll after drying. The buffing step is for the purpose of removing a skin surface and to make the porous portion exposed to the surface. In order to give a better appearance to the product, it is preferable to conduct buffing under the following conditions:

That is, the buffing is carried out at a relative buffing speed of at least 2 to 80 m./sec., more preferably 10 to 60 m./sec. at the buffing surface using a sand paper or sand cloth whose grain size corresponds to that of abrasive material No. 80 to 220 prescribed in JIS R6252–1966 or JIS R6251–1966. Even if the running direction of the coated substrate is the same as or opposite to that of the sand paper or cloth, the relative buffing speed of the sand paper or cloth with respect to the coated substrate must satisfy said condition. When a coarse sand paper or cloth is used within said range, the relative buffing speed must be increased. On the other hand, when a fine sand paper or cloth is used, the relative buffing speed must be decreased. By so doing, a product having a particularly better surface can be obtained.

As a buffing machine, a drum sander or a belt sander usually used in buffing natural leather can be employed, but any other machine can be employed so long as it can attain the same effect.

The feature of the present invention is that the synthetic polymer solution is coagulated by exposing it to a high moisture atmosphere after being coated with a mixture containing said synthetic polymer, while the shapes of the powders in the coated layer are retained as they are, and then the powders and solvent are extracted from the coagulated synthetic polymer.

The advantages of the suede-like material prepared according to the present invention over the natural suede leather are mentioned as follows:

(1) A long, uniform product can be stably obtained.
(2) Desirable coloring can be effected.
(3) No fingerprints are left on the surface of the product.
(4) Water washing of the product is possible.
(5) The product has moisture permeability.

Embodiments of the present invention are hereunder explained in the examples, wherein "parts" are by weight.

EXAMPLE 1

Napped cotton cloth was coated with the following mixture up to a thickness of 1 mm. of coating, left for 5 minutes in an atmosphere having a relative humidity of 90% and a temperature of 45° C., dipped into water at 25° C. for 16 hours, and dried at 90° C.

| | Parts |
|---|---|
| Urethane elastomer [1] | 100 |
| Sodium hydrogen carbonate [2] | 350 |
| Pigment (carbonblack) | 10 |
| N,N-dimethyl formamide | 350 |

[1] An elastomer having a hardness of 85 and being prepared by reacting adipic acid with ethylene glycol, further reacting the resulting polyester with diphenylmethane-4,4'-diisocyanate, and chain-extending with ethylene glycol.
[2] Most of the powders have particle sizes of 200 to 250 mesh.

Then, about one-third of the coated film was buffed off by a drum sander wrapped with a sand paper No. 150 running at a relative buffing speed of 20 m./sec. with respect to the coated film in a direction opposite to the running direction of the coated film.

EXAMPLE 2

A mat of 250 g./m.² was prepared from a 1:1 mixture of polyamide fibers (3 d. x 38 mm.) and polyester fibers (3 d. x 38 mm.) by means of a garnett and cross-folder, subjected to needle punching at a punch density of 1200/in.², and impregnated with the following binder solution so that the solid resin content is 30 parts by weight per 100 parts of fibrous mat:

| | Parts |
|---|---|
| Urethane elastomer [1] | 15 |
| Pigment (carbonblack) | 0.5 |
| N,N-dimethyl formamide | 84.5 |

[1] An elastomer prepared by reacting propylene glycol with diphenylmethane-4,4'-diisocyanate and then chain-extending with propylene glycol.

Then, the mat was dipped into water for 24 hours, and then dried, and both sides of the mat were buffed to a thickness of 0.8 mm. by a roll wrapped with a sand paper No. 100. The thus obtained mat was used as a fibrous substrate and coated with the following mixture to a thickness of 1.3 mm. of coating:

| | Parts |
|---|---|
| Urethane elastomer [1] | 100 |
| Sodium pyrophosphate [2] | 400 |
| Pigment (carbonblack) | 10 |
| N,N-dimethyl formamide | 460 |

[1] An elastomer having a hardness of 75 and being prepared by reacting adipic acid with ethylene glycol, further reacting the resulting polyester with diphenylmethane-4,4'-diisocyanate and chain-extending with 1,4-butanediol.
[2] Lumpy sodium pyrophosphate was pulverized to the following three particle size components by changing the pulverizing procedures and these three components were mixed in the following proportions:

| | Percent |
|---|---|
| 60–80 mesh | 3 |
| 80–200 mesh | 27 |
| More than 200 mesh | 70 |

Then, the coated mat was left for 5 minutes in an atmosphere having a temperature of 50° C. and a relative humidity of 90%, dipped in water at 25° C. for 24 hours, and dried at 90° C. and about one-third of the coated film was buffed off with a drum sander wrapped with a sand paper running at a relative speed of 100 m./sec. with respect to the coated film in the same direction as the running direction of the coated film, whereby a somewhat fine suede-like material having an appearance very similar to that of natural suede leather was obtained.

EXAMPLE 3

The same substrate as used in Example 2 was coated with a mixture having the same mixing proportion as in Example 2 to a thickness of 1.5 mm. of coating, except that the powders were adjusted to have the following particle size distribution by controlling the pulverization procedure, and finished in the same manner as in Example 1.

| | Percent |
|---|---|
| 60–80 mesh | 5 |
| 80–200 mesh | 50 |
| More than 200 mesh | 45 |

Somewhat coarser suede-like material having an appearance very similar to that of natural suede leather was thereby obtained, as compared with that obtained in Example 1.

EXAMPLE 4

The same substrate as in Example 2 was coated with the following mixture up to a thickness of 1.3 mm. and then finished in the same manner as in Example 2.

| | Parts |
|---|---|
| Urethane elastomer [1] | 90 |
| Polyvinyl chloride | 10 |
| Lactose powders [2] | 300 |
| Pigment (carbonblack) | 15 |
| N,N-dimethyl formamide | 350 |
| Methylethyl ketone | 100 |

[1] An elastomer prepared by reacting poly-1,4-butylene adipate with diphenylmethane-4,4'-diisocyanate, and chain-extending with 1,4-butanediol (a 9:1 blend of the urethane elastomer and polyvinyl chloride had a hardness of 90).
[2] Particle sizes were adjusted to have 150–200 mesh.

We claim:

1. A method for preparing a suede-like material, which comprises coating a sheet backing material with a mixture consisting of a polyurethane elastomer prepared by reacting a polyester or a polyether with a diisocyanate and further extending the chain of the resulting product with a glycol or a diamine; the hardness of said polyurethane elastomer ranging from 75 to 95 when determined by the Spring-type Hardness Test procedure set forth in JIS K–6301 (1962), at least one solvent selected from the group consisting of dimethyl formamide, diethyl formamide, acetone, methyl-ethyl ketone, tetrahydrofuran and dioxane, and 0.5 to 7 parts by weight of a powder selected from the group consisting of sodium carbonate, sodium hydrogen carbonate, sodium sulphate, sodium tripolyphosphate, anhydrous sodium pyrophosphate, sodium hydrogen pyrophosphate and lactose, per one part of said polyurethane elastomer, the particle size of said powder ranging from 50 to 400 mesh as defined by ASTM E–11–61, exposing the thus coated backing material to a high moisture atmosphere thereby coagulate said polyurethane elastomer, dipping the coated backing material in water to thereby remove the solvent and powder from the coated mixture by extraction, drying the backing material, and buffing the coated surface of the backing material.

2. A method according to claim 1, wherein the powder has the following particle size distribution:
    (a) 50–80 mesh components: 0–10 percent by weight
    (b) 80–200 mesh components: 20–80 percent by weight and
    (c) components of more than 200 mesh: 80–20 percent by weight.

3. A method according to claim 1 wherein the polyurethane elastomer is the reaction product of diphenylmethane-4,4'-diisocyanate and the polyester formed from adipic acid and ethyleneglycol or propyleneglycol wherein the reaction product is chain-extended with ethylene glycol or propylene glycol.

4. A method for preparing a suede-like material, which comprises coating a sheet backing material with a mixture consisting of a polyurethane elastomer prepared by reacting a polyester or a polyether with a diisocyanate and further extending the chain of the resulting product with a glycol or a diamine; the hardness of said polyurethane elastomer ranging from 75 to 95 when determined by the Spring-type Hardness Test procedure set forth in JIS K–6301 (1962), at least one solvent selected from the group consisting of dimethyl formamide, diethyl formamide, acetone, methyl-ethyl ketone, tetrahydrofuran and dioxane, 0.5 to 7 parts by weight of a powder selected from the group consisting of sodium carbonate, sodium hydrogen carbonate, sodium sulphate, sodium tripolyphosphate, anhydrous sodium pyrophosphate, sodium hydrogen pyrophosphate and lactose, per one part of said polyurethane elastomer, the particle size of said powder ranging from 50 to 400 mesh as defined by ASTM E–11–61, and a pigment, exposing the thus coated backing material to a high moisture atmosphere to coagulate said polyurethane elastomer, dipping the coated backing material in water to thereby remove the solvent and powder from the coated mixture by extraction, drying the backing material, and buffing the coated surface of the backing material.

References Cited

UNITED STATES PATENTS

| | | | |
|---|---|---|---|
| 2,826,509 | 3/1958 | Sarbach | 117—63 |
| 3,100,721 | 8/1963 | Holden | 117—63 |
| 2,819,981 | 1/1958 | Schornstheimer et al. | 117—63 |
| 2,837,440 | 6/1958 | Boivin | 117—63 |
| 3,000,757 | 9/1961 | Johnston et al. | 117—63 |
| 3,369,925 | 2/1968 | Matsushita et al. | 117—63 |
| 3,449,153 | 6/1969 | Saligny et al. | 117—63 |
| 3,460,969 | 8/1969 | Murphy | 117—63 |
| 3,486,968 | 12/1969 | Mater. | |
| 3,496,001 | 2/1970 | Ichiro Minobe et al. | |

WILLIAM D. MARTIN, Primary Examiner

M. SOFOCLEOUS, Assistant Examiner

U.S. Cl. X.R.

117—11, 135.5, 161KP; 264—49